(12) United States Patent
Andrews

(10) Patent No.: US 6,642,914 B1
(45) Date of Patent: Nov. 4, 2003

(54) LIQUID CRYSTAL DISPLAY (LCD) HAVING IMPROVED ISOCONTRAST PERFORMANCE AND METHOD FOR PRODUCING SAME

(75) Inventor: Michael Andrews, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/548,770

(22) Filed: Apr. 13, 2000

(51) Int. Cl.[7] .................................................. G09G 3/36
(52) U.S. Cl. ........................................... 345/87; 345/43
(58) Field of Search .............................. 345/43, 48, 50, 345/87, 89, 694, 695, 696, 698; 349/142, 139, 143, 145, 146, 144, 200

(56) References Cited

U.S. PATENT DOCUMENTS

| | | | | |
|---|---|---|---|---|
| 3,673,451 A | * | 6/1972 | Tackett ........................ 345/43 |
| 3,699,377 A | * | 10/1972 | Hall et al. ..................... 345/43 |
| 3,826,949 A | * | 7/1974 | Nakamura et al. ............. 345/43 |
| 3,938,134 A | * | 2/1976 | Hackstein et al. ............. 345/87 |
| 4,689,617 A | * | 8/1987 | Costa et al. ................... 345/43 |
| 5,122,888 A | * | 6/1992 | Lizuka et al. ................ 349/200 |
| 5,124,695 A | * | 6/1992 | Green .......................... 345/89 |
| 5,977,562 A | * | 11/1999 | Hirakata et al. ............. 349/142 |
| 6,191,881 B1 | * | 2/2001 | Tajima et al. ................. 349/77 |

* cited by examiner

*Primary Examiner*—Xiao Wu

(57) ABSTRACT

An improved liquid crystal display includes overlapped electrical conductors in a picture element (pixel) region of a liquid crystal material. The conductors are selectively defined so as to control the electric field applied to the liquid crystal material in a region associated with the liquid crystal material. By controlling the electric field in the region, the degree to which the molecules in the liquid crystal material rotate in response to the electric field can be controlled. In this manner, the contrast of the liquid crystal material in the region may be selectively controlled to, for example, improve the contrast of the liquid crystal display in multiple axes.

12 Claims, 6 Drawing Sheets

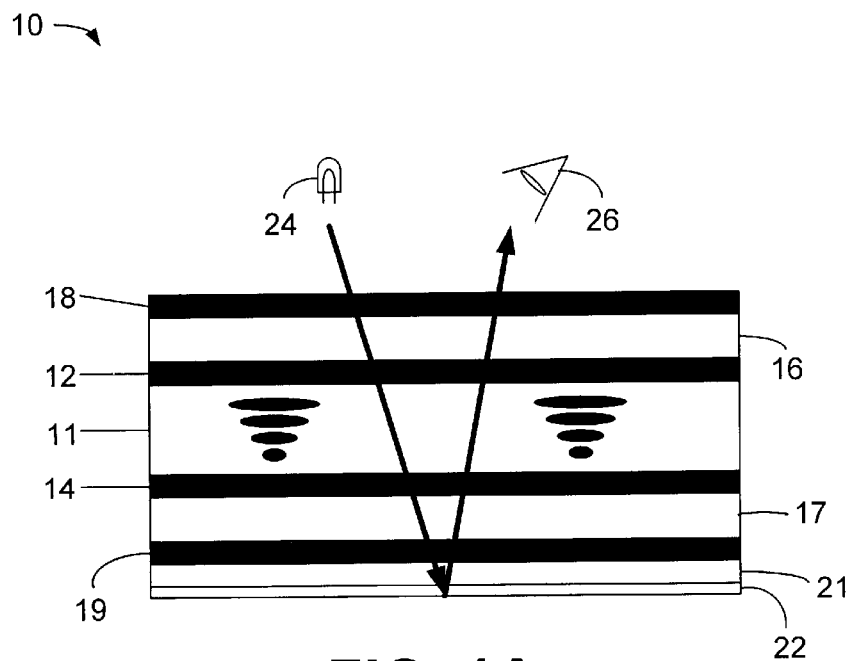
FIG. 1A
(Prior Art)
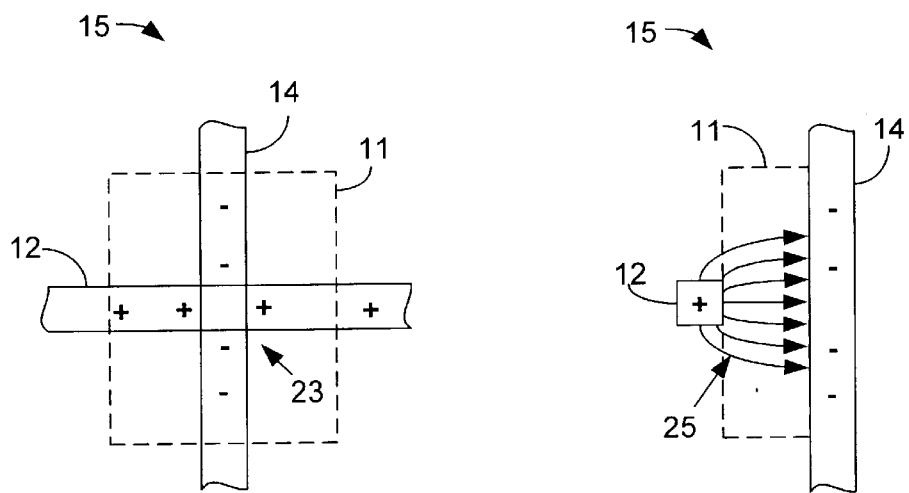
FIG. 1B
(Prior Art)
FIG. 1C
(Prior Art)

LIQUID CRYSTAL DISPLAY (LCD) HAVING IMPROVED ISOCONTRAST PERFORMANCE AND METHOD FOR PRODUCING SAME

TECHNICAL FIELD

The invention relates generally to liquid crystal displays, and, more particularly, to a liquid crystal display having improved isocontrast performance and a method for producing same.

BACKGROUND OF THE INVENTION

Liquid crystal displays (LCDs) have been in use for quite some time and are useful for displaying information. Although LCDs are attractive for use in displays for portable devices in which power consumption is a concern, LCDs are also commonly used in other display applications, such as test and monitoring equipment. Advantageously, LCDs typically consume a relatively small amount of power.

An LCD can be fabricated either as a reflective display, in which light passes through the display and is reflected back through the display for viewing, or as a transmissive display, in which a light source is located behind the display and a viewer directly views the display.

FIG. 1A is a cross-sectional view illustrating an example of a conventional reflective LCD 10. Briefly described, an LCD is fabricated by locating a liquid crystal (LC) material 11 between glass substrate elements 16 and 17, to which transparent indium tin oxide (ITO) electrode lines 12 and 14 have been applied. The ITO lines 12 and 14 are applied to the glass substrate elements 16 and 17 in a manner such that the ITO lines form a matrix of intersecting lines. The ITO lines 12 and 14 are typically oriented orthogonal to each other such that a picture element (pixel) is formed in the liquid crystal material at the intersection of each ITO line 12 and 14.

A polarizer 18 is applied to a surface of glass substrate element 16 opposite that to which the ITO line 12 is applied. Similarly, analyzer 19 is applied to a surface of glass substrate element 17 opposite to which the ITO line 14 is applied. A diffuser 21 is applied over the analyzer and a reflector 22 is applied over the diffuser. In the case of a transmissive display, a light source is located in place of the reflector 22. The polarizer 18 is a thin film applied to the glass to serve as a filter that polarizes the impinging light so that the entering light beam is polarized in one direction. The analyzer is a thin film that aids in the polarization process. The diffuser 21 is also a thin film that diffuses, or smears, the light beam so that annoying birefringence does not occur when the display is viewed. Birefringence can be explained by understanding the refraction of a plane wave of light at the boundary between an isotropic medium (such as air) and an anisciropic medium (such as a crystal). The wavefronts of the incident wave and the refracted wave should be matched at the boundary. Because the anisotropic medium supports two modes of distinctly different phase velocities, for each incident wave there are two refracted waves with two different directions and different polarizations. This effect is known as birefringence.

Upon the application of an electrical potential between the ITO line 12 and the ITO line 14, an electric field is established between the ITO lines 12 and 14 and passes through the LC material. In accordance with known principles, the molecules in the LC material, in response to the electric field, become mobile and. depending upon the type of LC material, will rotate, twist, or otherwise change state, thereby preventing light, by the cross polarizing of the traveling light wave. from passing through the display and appearing dark to a viewer. The display may be normally white or black. Upon the application of the electric field, the LC material will change state. In other words, if the material is "black" it will become "white" and if the material is "white" it will become "black." Importantly, the LC material changes state in response to the electric field applied by the ITO lines 12 and 14.

FIG. 1B is a plan view schematically illustrating a conventional pixel 15 formed at the intersection 23 (referred to as a "pixel junction") of ITO lines 12 and 14 of the LCD 10 of FIG. 1A. Some of the elements have been omitted for clarity. Pixel 15 includes the LC material 11 located at the intersection of, and disposed between ITO lines 12 and 14.

FIG. 1C is a cross-sectional view of the conventional pixel 15 of FIG. 1B. In response to the electric, or e field 25, created in the region of the pixel junction 23 between ITO line 12 and ITO line 14, the molecules that make up LC material 11 will change state, or rotate, thereby becoming visible to a viewer (24 of FIG. 1A).

FIG. 1D is a cross-sectional view of the conventional reflective LCD 10 of FIG. 1A illustrating the difference between an "addressed" pixel and a "non-addressed" pixel. In FIG. 1D, the LC material 11 is illustrated as comprising individual molecules, an example of which is indicated by reference numeral 13. The voltage source "Vs" 27 corresponding to pixel 33 indicates that the LC material 11 within pixel 33 is selected or addressed. When addressed, the orientation of the individual molecules 13 within the LC material 11 sandwiched between alignment layer 28 and alignment layer 29 change state, or twist, and appear to "straighten out". Alignment layers 28 and 29 are each thin films which have been physically rubbed in specific directions so as to assist the LC molecules 13 adjacent to these layers to pre-rotate in favorable directions. For example, if it is desirable for an LCD to have a preferred viewing angle, these rubbed layers enhance that angular view. The aligned molecules 13 (associated with pixel 33) allow the light from light source 24 to pass through the LC material 11 with a specific polarization. The light from light source 24 can be reflected back to the viewer 26 through glass substrate element 16 and polarizer 18.

The molecules 13 within pixel 35. associated with voltage source "Vna" 26, have not been addressed. The random molecular orientation of these molecules 13 suppresses the light from light source 24 and prevents the light from passing through the LC material 11 associated with pixel 35. Hence, pixel 35 is non-addressed and would appear dark to a viewer 26.

FIG. 1E is a graphical representation 31 of the isocontrast curves of pixel 15 of FIGS. 1B and 1C. When LCDs are viewed at angles normal to, or nearly normal to, the surface of the LCD display, the rotated liquid crystal material is easy to discern. However, when viewed at off angles, the polarizing effect of the twisted liquid crystal material on the traveling light wave quickly becomes indiscernible. This is caused by the crystalline nature of the liquid crystal material. This condition is illustrated in FIG. 1E, which is a graphical representation of a contrast curve (referred to as an isocontrast curve) for a conventional pixel 15. A contrast curve which has the same contrast ratio (light returning from the addressed pixel/light returning from a non-addressed pixel) at every point on its curve is called an isocontrast curve. As shown in FIG. 1E, the liquid crystal material in the region of pixel 15 clearly has better contrast at some angles that at other angles. For example, isocontrast line 34 shows that the pixel has a higher contrast when viewed at approximately 180 or 360 degrees, than it does when viewed at 90 or 270 degrees. For example, arrow 37 indicates a viewing angle in which a viewer would see limited contrast.

Therefore there is a need in the industry for a liquid crystal display in which the contrast of the liquid material may be controlled and maximized depending on the viewing angle desired.

SUMMARY OF THE INVENTION

The invention is a liquid crystal display having improved and controllable isocontrast and a method for producing same.

In architecture, the invention can be conceptualized as a liquid crystal display, comprising a liquid crystal material disposed between a pair of transparent plates. The display includes a first electrical conductor and a second electrical conductor associated with the liquid crystal material and configured to form a picture element in an overlap region in which the first electrical conductor and the second electrical conductor overlap. The first electrical conductor and the second electrical conductor are configured to apply an electric field to the liquid crystal material. The electric field causes molecules in the liquid crystal material to change state in response to the electric field in the overlap region associated with the picture element. The overlap region is selectively defined to alter the electric field so that a degree to which the liquid crystal molecules change state in response to the electric field is controlled by the selectively defined overlap region.

The invention can also be conceptualized as a method for controlling contrast in a liquid crystal display, the method comprising the steps of: forming a liquid crystal material between a pair of transparent plates and associating a first electrical conductor and a second electrical conductor with the liquid crystal material. The method also includes the step of forming a picture element in a region in which the first electrical conductor and the second electrical conductor overlap. The first electrical conductor and the second electrical conductor apply an electric field to the liquid crystal material. The electric field causes molecules in the liquid crystal material to change state in response to the electric field in the region associated with the picture element. The method also includes the step of selectively defining the overlap region to alter the electric field so that a degree to which the liquid crystal molecules change state in response to the electric field is controlled by the selectively defined overlap region. The invention allows control over the shape of the electric field so that the change in state, or twist, of the liquid crystal material is controllable so as to allow favorable viewing of the display from any angle, thereby reducing, and possibly eliminating, blind spots.

An advantage of the invention is that it allows control over the contrast of a liquid crystal display.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the invention.

FIG. 1A is a cross-sectional view illustrating an example of a conventional reflective LCD;

FIG. 1B is a plan view schematically illustrating a conventional pixel formed at the intersection of the ITO lines of the LCD of FIG. 1A;

FIG. 1C is a cross-sectional view of the conventional pixel of FIG. 1B;

DETAILED DESCRIPTION OF THE INVENTION

The following description applies to all liquid crystal (LC) displays, and furthermore, applies to all systems and methods in which the state of a liquid crystal material is altered by the application of an electric field to the LC material.

Figure 2:
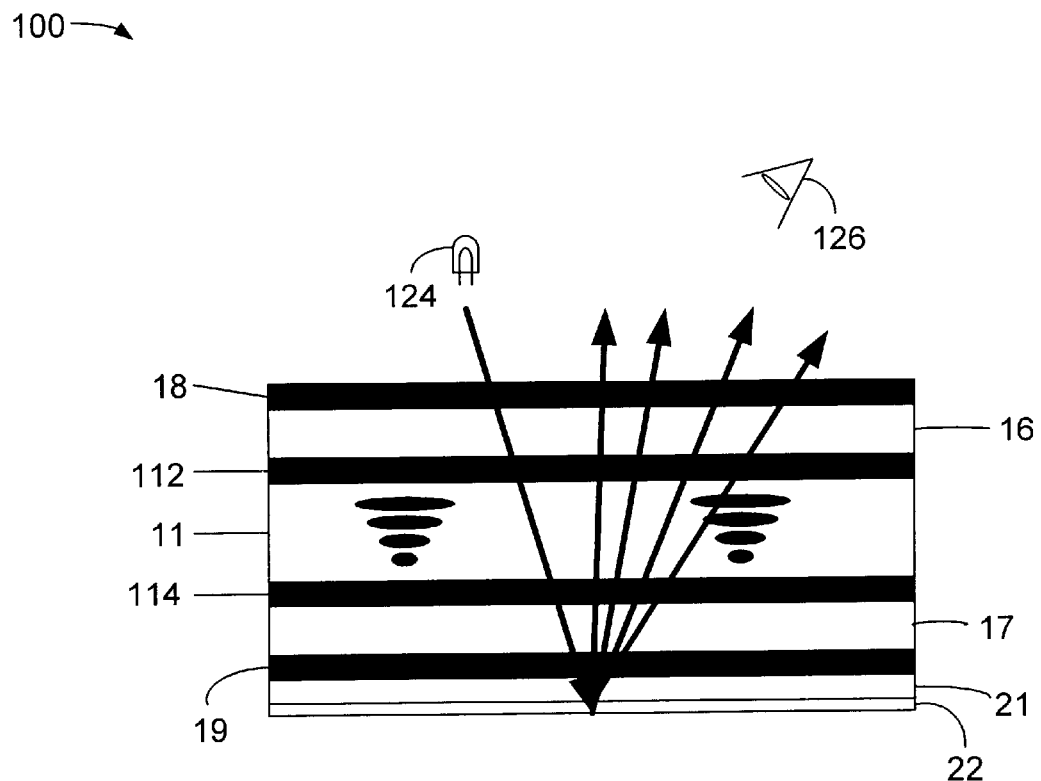
FIG. 2 is a cross-sectional view illustrating a liquid crystal display constructed in accordance with an aspect of the invention.

Turning now to the drawings, FIG. 2 is a cross-sectional view illustrating a liquid crystal display constructed in accordance with an aspect of the invention. LCD 100 includes LC material 11 disposed between glass substrate elements 16 and 17. ITO electrode line 112 is applied to the surface of glass substrate 16 that faces LC material 11 and ITO electrode line 114 is applied to the surface of glass substrate 17 that faces LC material 11. The ITO lines 112 and 114 are applied to the glass substrate elements 16 and 17 in a manner such that the ITO lines form a matrix of intersecting lines. For example, the ITO lines 112 may be applied in one direction and the ITO lines 114 may be applied in a direction orthogonal to the direction of the ITO lines 112. However, and in accordance with an aspect of the invention, the ITO lines 112 and 114 are selectively defined and configured so as to selectively alter the electric field created between the lines 112 and 114 so as to control the change of state of the LC material 11 there between. The ITO lines 112 and 114 may also be applied to the glass substrate elements 16 and 17, respectively, at angles other than orthogonal to each other. Furthermore, other conductive material may be used in place of ITO.

A polarizer 18 is applied to the surface of glass substrate element 16 opposite that to which the ITO line 112 is applied. Similarly, analyzer 19 is applied to the surface of glass substrate element 17 opposite that to which ITO line 114 is applied. A diffuser 21 is applied over the analyzer and a reflector 22 is applied over the diffuser.

In accordance with an aspect of the invention. and to be described below, an electric field created between the ITO line 112 and the ITO line 114 passes through the LC material 11 at the point where ITO line 112 crosses, or overlaps, ITO line 114. In accordance with an aspect of the invention, the electric field causes the LC material located between ITO line 112 and ITO line 114 to change state to a further degree than previously possible. In this manner, and with respect to a reflective display as shown in FIG. 2, light from a light source 124 travels through LC material 11 and is reflected back to a viewer 126 such that the viewer 126 may observe the selected pixels from a wider viewing angle than previously achievable.

Figure 3A:
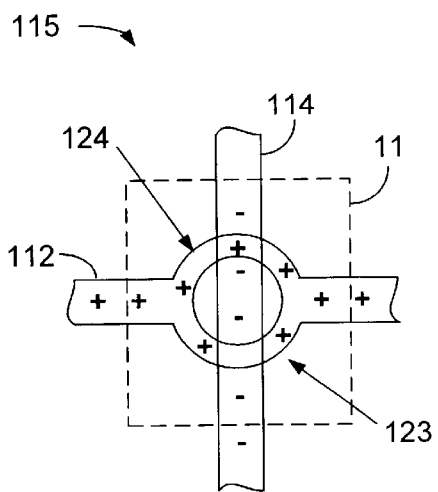
FIG. 3A is a plan view illustrating a pixel constructed in accordance with an aspect of the invention.

FIG. 3A is a plan view illustrating a pixel 115 constructed in accordance with an aspect of the invention. The pixel 115 includes LC material 11 (illustrated with a dotted line for clarity), located between ITO line 112 and 114. The region in which ITO lines 112 and 114 intersect, or overlap, is known as the pixel junction 123, and is the region in which the pixel 115 is formed. In accordance with an aspect of the invention, the ITO line 112 is formed so that in the overlap region of pixel junction 123, a circular portion 124 of the ITO line 112 intersects and overlaps the ITO line 114, thus increasing the area of the overlap region in which the ITO lines 112 and 114 form the pixel 115. Similarly, the ITO line 114 could be made in this circular fashion, while the ITO line 112 remains rectangular. Furthermore, both ITO lines 12 and 114 can be constructed using circular portion 124. Importantly, the circular portion 124 increases the area over which the ITO lines 112 and 114 intersect area and favorably changes the shape of the "twisted" LC material 11 over which ITO lines 112 and 114 intersect.

Figure 3B:
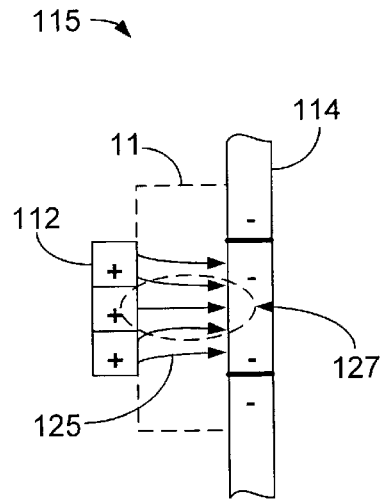
FIG. 3B is a cross-sectional view of the pixel of FIG. 3A.

FIG. 3B is a cross-sectional view of the pixel 115 of FIG. 3A. As shown in FIG. 3B, ITO line 112 applies a positive charge to the LC material 11 and ITO line 114 applies a negative charge to the LC material 11. Upon application of a voltage potential to ITO lines 112 and 114, an electric field 125 is created between the circular portion 124 of ITO line 112 and ITO line 114. The electric field 125 passes through LC material 11, causing the molecules in the LC material to change state. In accordance with the invention, and shown within region 127 of FIG. 3B, there is a favorable bunching of the electric field 125 in the region 127, caused by the selective application of the ITO line 112 having the circular portion 124, thereby applying a more favorable and greater electromotive force (emf) field in the region 127. The greater emf field passes through LC material 11, thereby causing the liquid crystal molecules within LC material 11 to change state to a higher degree than if the ITO line 112 was conventionally formed. In this manner, the more favorably shaped emf field results in a greater twist of the molecules within LC material 11 that shapes the isocontrast curve as desired (to be described below with respect to FIG. 5). This greater twist results in the LC material having a higher contrast at pixel location 115.

Figure 4A:
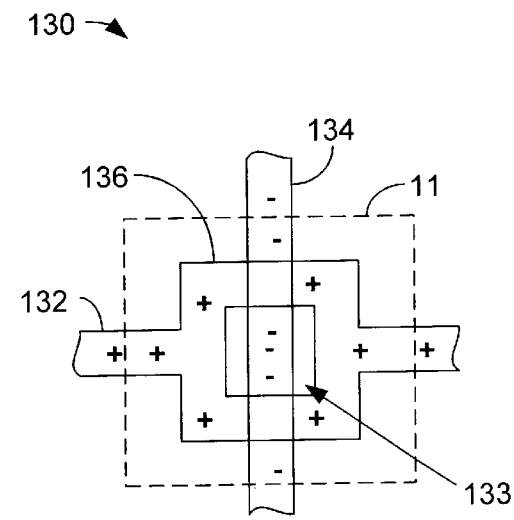
FIG. 4A is a plan view illustrating an alternative embodiment of the pixel of FIGS. 3A and 3B.

FIG. 4A is a plan view illustrating an alternative embodiment of the pixel of FIGS. 3A and 3B. Pixel 130 is formed such that ITO line 132 is selectively defined so as to describe a square profile 136 at the pixel junction 133 at which ITO line 132 intersects ITO line 134. In this manner, the selective formation of the ITO line 132 increases the area over which the ITO lines 132 and 134 cover LC material 11.

Figure 4B:
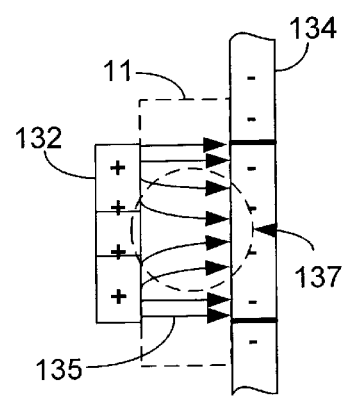
FIG. 4B is a cross-sectional schematic view illustrating the pixel of FIG. 4A.

FIG. 4B is a cross-sectional schematic view illustrating the pixel 130 of FIG. 4A. In accordance with this aspect of the invention, the ITO line 132 applies a positive charge to the LC material 11 and the ITO line 134 applies a negative charge to the LC material 11. As shown, the electric field 135 created between the square portion 136 of ITO line 132 and ITO line 134 causes a "focusing" of the electric field 135 in the region indicated by arrow 137. Focusing the electric field 135 at the pixel junction 133 results in a greater contrast ratio, thereby providing a pixel having a broader viewing angle. It should be understood that various ITO line configurations can be used with equal effectiveness to both improve the isocontrast ratio and shape of the isocontrast curve.

Figure 1D:
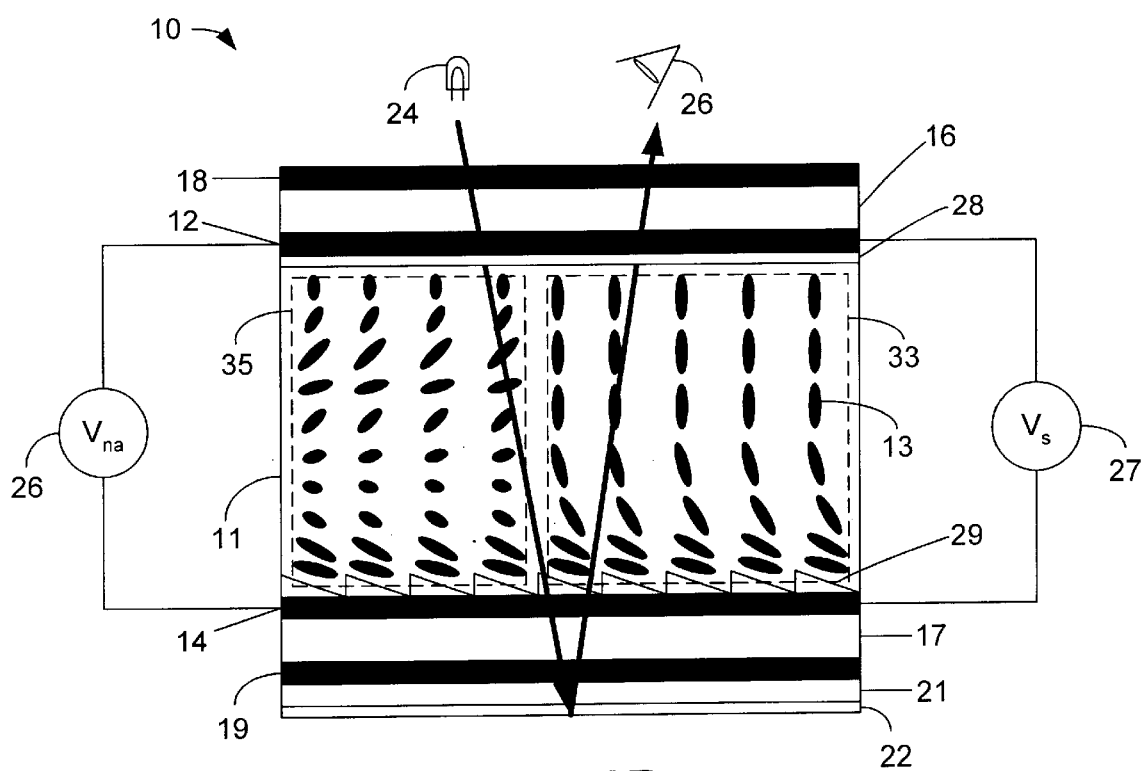
FIG. 1D is a cross-sectional view of the conventional reflective LCD of FIG. 1A illustrating the difference between an "addressed" pixel and a "non-addressed" pixel.
Figure 1E:
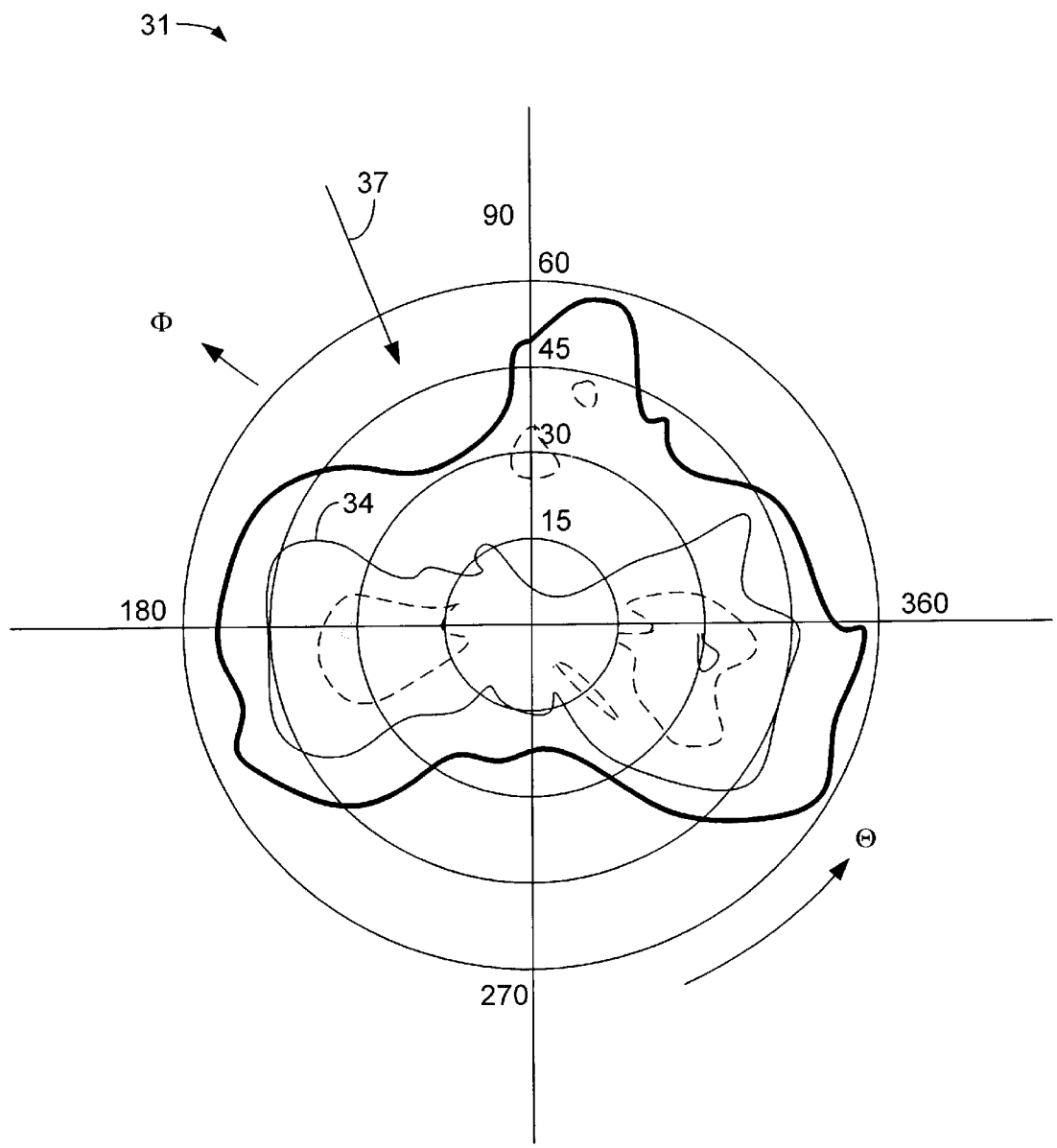
FIG. 1E is a graphical representation of the isocontrast curves of the pixel of FIGS. 1B and 1C.
Figure 5:
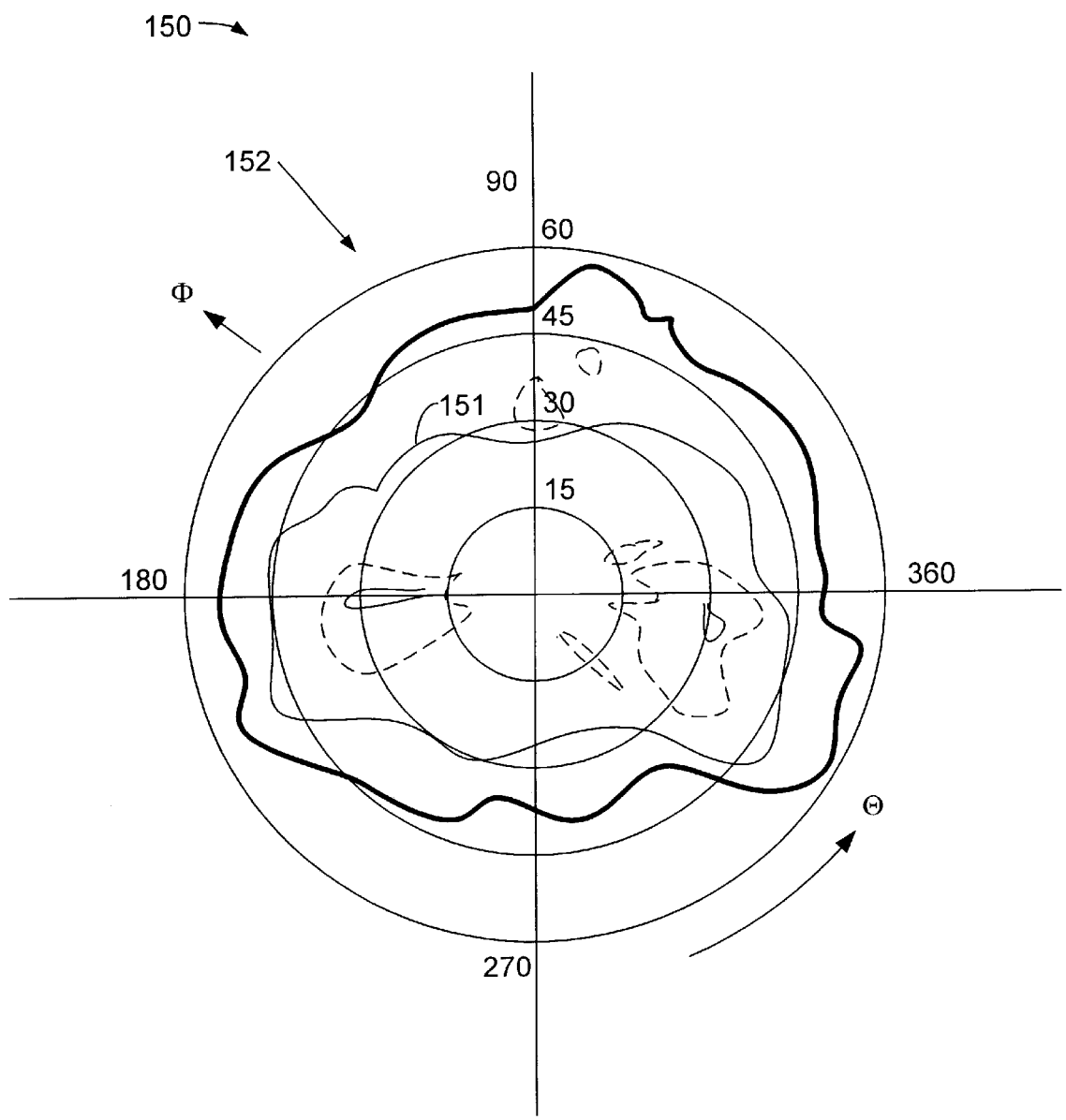
FIG. 5 is a graphical representation of the isocontrast curves of the pixel of FIGS. 3A and 3B.

FIG. 5 is a graphical representation 150 of the isocontrast curves of pixel 115 of FIGS. 3A and 3B. As shown in FIG. 5, isocontrast curve 151 is significantly more circular in shape than isocontrast curve 34 of FIG. 1E. In this manner, the ability to view the pixel represented by curve 151 is improved at the 90 and 270 degree viewing angles as compared to the viewing angle of pixel 15 (FIG. 1E). The arrow 152 indicates that the blind spot illustrated using arrow 37 of FIG. 1E is substantially reduced in the pixel 115 corresponding to the isocontrast curve 151 of FIG. 5.

It will be apparent to those skilled in the art that many modifications and variations may be made to the preferred embodiments of the invention, as set forth above, without departing substantially from the principles of the invention. All such modifications and variations are intended to be included herein within the scope of the invention, as defined in the claims that follow.

What is claimed is:

1. A liquid crystal display, comprising:
   a liquid crystal material disposed between a pair of transparent plates;
   a first electrical conductor and a second electrical conductor associated with said liquid crystal material and configured to form a picture element in an overlap region in which said first electrical conductor and said second electrical conductor overlap, said first electrical conductor and said second electrical conductor configured to apply an electric field to said liquid crystal material, said electric field causing molecules in said liquid crystal material to change state in response to said electric field in said overlap region associated with said picture element, said first electrical conductor having a different shape than said second electrical conductor; and
   wherein said overlap region is selectively defined to alter said electric field so that a degree to which said liquid crystal molecules change state in response to said electric field is controlled by said selectively defined overlap region, said electric field being focused substantially orthogonal to a surface of said first electrical conductor and said second electrical conductor in said selectively defined overlap region.

2. The liquid crystal display of claim 1, wherein said selectively defined overlap region maximizes said change in state of said liquid crystal molecules.

3. The liquid crystal display of claim 1, wherein said selectively defined overlap region controls said electric field.

4. The liquid crystal display of claim 1, wherein said selectively defined overlap region maximizes an electromotive force in said selectively defined overlap region.

5. The liquid crystal display of claim 1, wherein said first electrical conductor describes a circle in said selectively defined overlap region.

6. The liquid crystal display of claim 1, wherein said first electrical conductor describes a square in said selectively defined overlap region.

7. A method for controlling contrast in a liquid crystal display, the method comprising the steps of:
   locating a liquid crystal material between a pair of transparent plates;

associating a first electrical conductor and a second electrical conductor with said liquid crystal material;

forming a picture element in a region in which said first electrical conductor and said second electrical conductor overlap, said first electrical conductor and said second electrical conductor configured to apply an electric field to said liquid crystal material, said electric field causing molecules in said liquid crystal material to change state in response to said electric field, in said region associated with said picture element, said first electrical conductor having a different shape than said second electrical conductor; and selectively defining said region to alter said electric field so that a degree to which said molecules change state in response to said electric field is controlled by said selectively defined region, said electric field being focused substantially orthogonal to a surface of said first electrical conductor and said second electrical conductor in said selectively defined overlap region.

8. The method of claim 7, further comprising the step of using said selectively defined region to maximize said change in state of said molecules.

9. The method of claim 7, further comprising the step of using said selectively defined region to shape said electric field.

10. The method of claim 7, wherein said selectively defined overlap region maximizes an electromotive force in said selectively defined region.

11. The method of claim 7, further comprising the step of forming said first electrical conductor into a circle in said selectively defined region.

12. The method of claim 7, further comprising the step of forming said first electrical conductor into a square in said selectively defined region.

* * * * *